(No Model.)
A. WARTER.
PNEUMATIC ELEVATING DEVICE FOR LIQUIDS.
No. 605,212. Patented June 7, 1898.
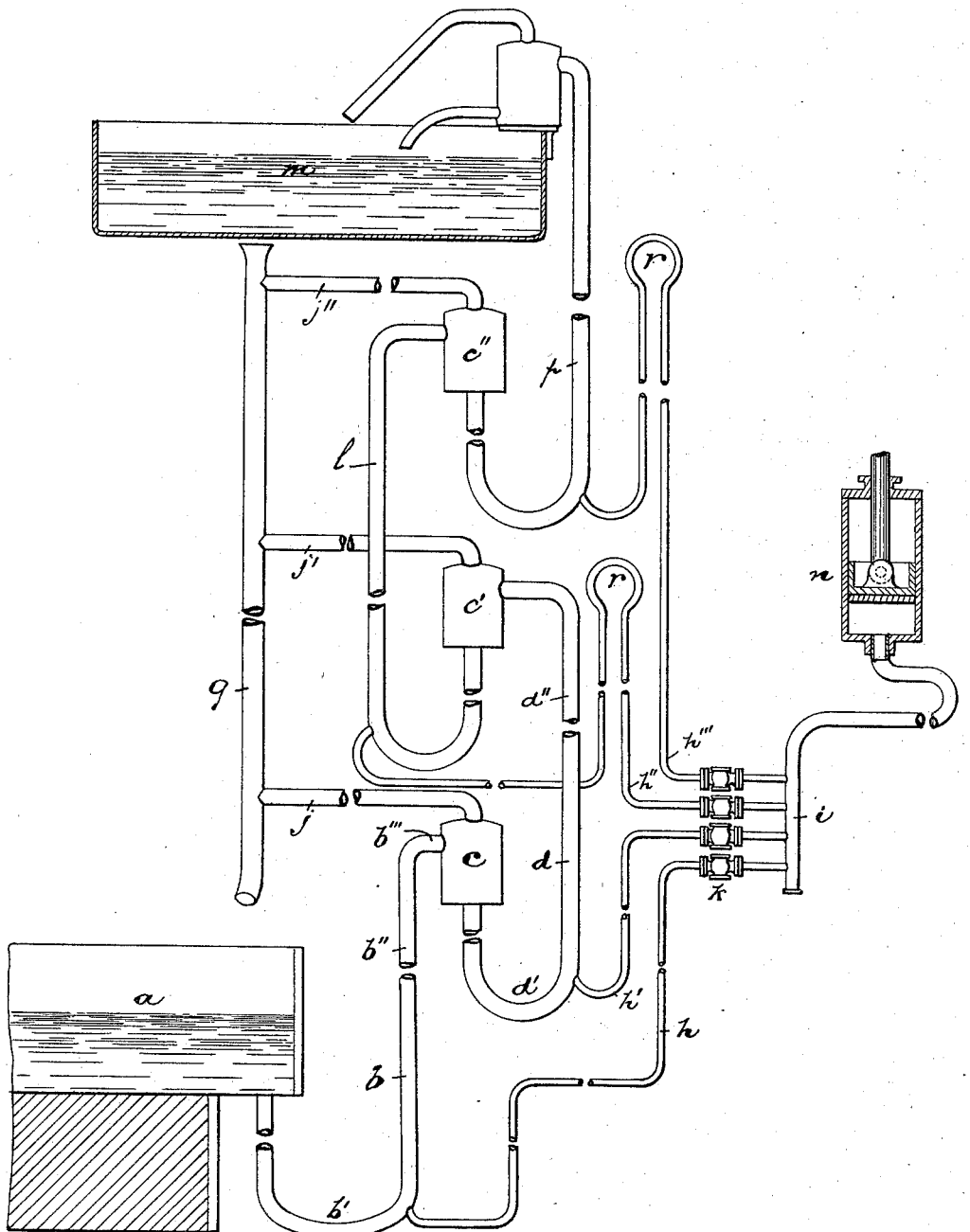
WITNESSES:
A. R. Krausse
C. B. Sidney
INVENTOR
Antoine Warter
BY Drake & Co.
ATTORNEYS.

UNITED STATES PATENT OFFICE.

ANTOINE WARTER, OF NEWARK, NEW JERSEY, ASSIGNOR OF ONE-HALF TO WILLIAM L. GLORIEUX, OF IRVINGTON, NEW JERSEY.

PNEUMATIC ELEVATING DEVICE FOR LIQUIDS.

SPECIFICATION forming part of Letters Patent No. 605,212, dated June 7, 1898.

Application filed September 29, 1897. Serial No. 653,432. (No model.)

*To all whom it may concern:*

Be it known that I, ANTOINE WARTER, a citizen of the United States, residing at Newark, in the county of Essex and State of New Jersey, have invented certain new and useful Improvements in Pneumatic Elevating Devices for Liquids; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The objects of this invention are to enable water, acids, or other liquids to be elevated to any desired height from comparatively shallow bodies; to do so at a small cost for the elevating means and at a lower cost of power; to provide a device that will be of simple structure, one not liable to become disarranged or clogged or otherwise obstructed in its operations; to provide a device which when employed in connection with acids cannot be destroyed by said acids and one which will not permit the overflowing or spattering of said acid, and to secure other advantages and results, some of which may be referred to hereinafter in connection with the description of the working parts.

The invention consists in the improved pneumatic elevating device for liquids and in the arrangements and combinations of parts thereof, all substantially as will be hereinafter set forth, and finally embraced in the clauses of the claim.

Referring to the accompanying drawing, which shows in elevation the system of pipes, tanks, &c., comprising the invention, and to the letters of reference marked thereon, $a$ indicates a tank or reservoir containing the body of liquid to be elevated. This may be an artificial structure or may be a natural body of water, such as a lake or river. When employed with sulfuric acid, this tank $a$ is preferably constructed of lead; but the material of the tank and other parts of the apparatus may be varied at will to suit the various liquids employed therewith. A duct or pipe $b$ descends from the lower part of said tank and curves or is turned, as at $b'$, the vertical extension $b''$ of which is of considerable length and extends above the upper surface of the body of liquid within the tank $a$. A lateral turn $b'''$ is given to the upper extremity of the pipe $b$, which empties into an elevated reservoir or tank $c$. This tank or reservoir $c$ may be a comparatively small structure or merely an enlargement of a second liquid-duct $d$. The reservoir, tank, or enlargement $c$ is in connection at its bottom with the second liquid-duct $d$ and at its top is provided with a relief-tube $j$, the latter extending from said tank, reservoir, or enlargement $c$ to a main relief-tube $g$. The said tank, enlargement, or reservoir $c$ is closed or has no openings except such as the tubes are fitted tightly into. It will thus be seen that there can be no overflow or spattering from the top of said tank, either of which would be dangerous or highly objectionable in the case of certain acids being elevated. Any overflow of liquid and the exhaust of the compressed air finds a safe and ready exit through the relief-duct $j$.

Where the pipe $b$, after descending from the tank $a$, turns upwardly, it receives an upwardly-turned compressed-air tube or pipe $h$, which is in connection with a main air-pipe $i$ and is adapted to convey the condensed or compressed air into said pipe $b$ and direct it upward, so that it will act to elevate the water lying in the pipe $b$ and force it above the normal level of the water lying in the tank $a$. The pipe $h$ is a branch of the main pipe $i$, in connection with an air-compressor $n$ of any suitable variety. The said supply-tube $h$ is preferably provided with a cock or valve $k$, adapted to prevent any backflow of water when the compressor is not in operation.

The pipe $d$, descending from the tank $c$, is also turned, as at $d'$, and extends vertically, as at $d''$, considerably above the elevated tank $c$, where it enters a second tank $c'$. A second branch compressed-air tube $h'$ enters the pipe $d$ at the lower end of the vertical extension and is turned upwardly at the point of connection to give upward direction to the air as it enters said pipe $d$, the parts being joined to force the water upward to and into the second elevated tank $c'$, of a higher grade of elevation than the tank $c$.

From the tank $c'$ the liquid is again elevated another gradation of height to the tank $c''$ by means of the descending, turned, and ascending pipe $l$ and compressed-air pipe $h''$, and from thence it is again elevated through the pipe $p$ to the receiving-reservoir $m$.

The elevated liquid mingled with the compressed air issues from the vertical pipes or extensions $b\ d\ l\ p$ into the tanks or enlargements $c\ c'\ c''\ m$, where the liquid in the mixture passes downward or is freed from the air, while the latter, freeing itself from the mixture, escapes through the branch tubes $j\ j'\ j''$ to the main escape-tube $g$, and thence to the open air. The said main escape-tube $g$ serves to conduct the drippings, condensed vapors, or overflow from the several ducts back to the source of supply $a$ or to some other suitable receptacle, thus rendering absolutely safe the use of the device in connection with powerful acids.

By the construction described the liquid is divided into small bodies and maintained in such divisions, so that there will be little back pressure to prevent the desired elevation to any required height, the number of tanks in the series $c\ c'\ c''$ being increased or diminished as the height to be gained by the liquid may require.

The system of escape or relief ducts $j\ j'\ j''$ is an important feature of my invention. These lead from the top of each enlargement without extending upward more than necessary to turn and open into the main duct $g$, which is preferably open at both top and bottom. All pressure in the top of the enlargement $c\ c'\ c''$ is thus relieved by communication with the open air, and when the rising fluid enters it does so against only normal atmospheric pressure. Besides allowing the escape of the air which ascends with the fluid the escape-ducts also provide means for conveying away any liquid overflow. For instance, if more compressed air happens to be supplied through one of the compressed-air tubes than through the next higher one it is evident that the accumulating liquid in the enlargement therebetween can pass away through the overflow-tube and all inconvenience and danger is automatically avoided. It will be seen that my apparatus forms a closed passage for the liquid from the source of supply to the point of elevation, an invaluable feature in the case of elevating powerful acids and reagents.

In operating the apparatus compressed air is first admitted through the lowest tube $h$ to pipe $b$. When the liquid overflows from the first enlargement $c$, through the drip-pipes $j$ and $g$, the valve $k$ of the second compressed-air tube $h'$ is opened to admit air to the pipe $d$, and this is repeated throughout the series.

Where the compressed-air tubes or pipes have their connections with the liquid-conducting pipes above the valves $k$, I prefer to form in said air-tubes ∩-shaped turns $r\ r$, as in the pipes $h''\ h'''$, the turns or bends lying somewhat above the level of the tanks from which the liquid flows which is elevated by the air from the respective tanks—or, for example, the turn $r$ in the air-pipe $h''$ lies above the level of the tank $c'$, the liquid from which is raised by the air from said tube, as will be understood upon examination of the drawings. Thus the fluid in said tank cannot fill the lower end of the tube $h''$ or gravitate through the pipe $h''$ to the air-compressor should the cock $k$ be open and the said compressor be inactive.

The arrangement of the valves $k$ upon the compressed-air tubes enables the apparatus to be operated from one point and makes it possible to open or close each tube independently of the rest.

Having thus described the invention, what I claim as new is—

1. The combination of a vertical series of covered reservoirs, connecting-pipes each leading downward from the bottom of a reservoir and being turned upward and entering the reservoir next higher, and compressed-air tubes leading from an air-compressor to each of said connecting-pipes, branch overflow-ducts leading from the tops of the reservoirs and a main overflow-duct connecting with each of said branch ducts, whereby liquid may flow from the filled reservoirs without being elevated, substantially as set forth.

2. The combination of the series of covered tanks or reservoirs $c, c', c''$, one elevated above another, the connecting-pipes $b, d, l$, each leading downward from the bottom of a tank and being turned upward and entering the upper part of the tank next higher, the compressed-air tubes leading into said connecting-pipes at the points where they are turned upward, and escape-ducts leading from the top of each tank to a vertical main duct which communicates at its lower end with the source of supply, the whole forming a closed passage for the liquid from the source of supply to the point of elevation, substantially as set forth.

3. In a pneumatic elevating device for liquids, the combination with a series of bent pipes $b, d, l$, each having long and short arms, the long arm of one communicating with the short arm of the next upper pipe of the series and conducting the liquid thereto, closed enlargements $c, c', c''$, being arranged at the connections, the long arms entering at the sides of said enlargements and the short arms extending down from a point at or near the bottom thereof, vent-tubes $j, j', j''$ extending from the upper parts of said enlargements to a common vent and drip pipe $g$, extending down to an initial tank or body of fluid to be elevated, and a series of compressed-air pipes $h, h', h''$, turned upward at one series of extremities and entering the bases or bottoms of the longer upward extensions of the fluid-elevating pipes $b, d, l$, and at the other extremities extending into close adjacency where they are provided with cut-off valves, a common compressed-air pipe connecting with each of said pipes $h$, $h'$, $h''$, and with a pump $n$, the upper pipes of the series of compressed-air pipes being bowed or bent double to extend above the points of egress from the fluid-elevating pipe into the said enlargements, substantially as set forth.

In testimony that I claim the foregoing I have hereunto set my hand this 14th day of September, 1897.

ANTOINE WARTER.

Witnesses:
 CHARLES H. PELL,
 C. B. PITNEY.